United States Patent [19]

Semaan

[11] Patent Number: 5,680,392
[45] Date of Patent: Oct. 21, 1997

[54] MULTIMEDIA MULTIPOINT TELECOMMUNICATIONS RESERVATION SYSTEMS

[75] Inventor: Ghassan Semaan, Montreal, Canada

[73] Assignee: General DataComm, Inc., Middlebury, Conn.

[21] Appl. No.: 586,259

[22] Filed: Jan. 16, 1996

[51] Int. Cl.$^6$ .................................................. H04L 12/18
[52] U.S. Cl. ............................ 370/261; 348/15; 379/204
[58] Field of Search .............................. 348/12, 14, 15; 370/260, 261, 263; 379/202, 204

[56] References Cited

U.S. PATENT DOCUMENTS

| 5,369,694 | 11/1994 | Bales et al. | 379/202 |
| 5,422,883 | 6/1995 | Hauris et al. | 370/261 |
| 5,530,472 | 6/1996 | Bregman et al. | 348/15 |

Primary Examiner—Benedict V. Safourek
Attorney, Agent, or Firm—David P. Gordon

[57] ABSTRACT

Reservation controllers and reservation systems for reservation of access to multimedia multipoint telecommunications servers (MCUs) are provided. The reservation controller establishes a reservation domain having a reservation request channel on which reservation applications may be taken. An ongoing reservation conference is associated with the reservation domain. The reservation domain is preferably established within the ITU-T T.120 standard series requirements, with multipoint connection under T.122/T.125, and interface to profiles such as ISDN, TCP/IP, X.25, ATM, Ethernet, etc., under T.123. A user makes reservations for MCU resources by knowing the address of the reservation domain, attaching himself to the reservation domain, joining the reservation conference via establishing one or more transport connections, and sending the reservation request onto the reservation request channel. All reservation requests forwarded onto the reservation request channel are received and acted upon by the reservation controller. Reservation systems utilizing a plurality of reservation controllers are also disclosed, where the reservation controllers are part of the same domain, are arranged in multiple domains on a single level, or are arranged in hierarchical domains. Where more than one reservation domain is established, same-level or hierarchical level bridges are established.

22 Claims, 6 Drawing Sheets

MULTIMEDIA MULTIPOINT TELECOMMUNICATIONS RESERVATION SYSTEMS

BACKGROUND

1. Field of the Invention

The present invention relates broadly to multipoint multimedia telecommunications systems. More particularly, the present invention relates to reservation systems for the use of multimedia multipoint servers which are used in the establishment and conduct of multipoint multimedia conferences.

2. State of the Art

With the increase of throughput (data rate) available in the telecommunications industry, and in association with the improvement of compression and decompression algorithms, the number of telecommunication applications available to individuals and businesses has increased dramatically. One of these applications is called "multimedia communications" which permits video, audio, and in some cases other data to be transported from one party to another or others. Multimedia communications can be utilized for a number of applications, and in different configurations. One configuration of recent interest has been multimedia conferencing, where several parties can communicate in a conference style.

In multimedia conferencing, the audio and video data is handled such that each party can see and hear one, several, or all of the other parties. In fact, various telecommunications recommendations and standards are presently being adopted by the ITU-T, ISO, and Bellcore which govern the protocols of multimedia conferencing (see, e.g., ITU-T T.120). In the multimedia conferencing systems of the art (as represented by prior art FIG. 1), the audio, video, and other data streams generated by a user's system 12a are multiplexed together directly in the encoder section of a multimedia encoder/decoder (codec) 14 located at the source/terminal 16, and transported together through the transport network 20 (now proposed in ATM format) to a similar "peer" codec at a remote location. The peer codec is either another codec 14 at the remote user site for a point-to-point conference, and/or a codec/switch 24 at a multimedia bridge 26 (also called a multipoint control unit or MCU) for a multipoint conference. The multipoint control unit 26, which typically includes a codec/switch 24 and a controller 28, provides conference control (e.g., it determines the signal to be sent to each participant), audio mixing (bridging) and multicasting, audio level detection for conference control, video switching, video mixing (e.g., a quad split, or "continuous presence device" which combines multiple images for display together) when available and/or desirable, and video multicasting. The audio and video data exiting the MCU is multiplexed, and continues through the transport network 20 to the desired multimedia source terminals 12b, 12c.

It will be appreciated by those skilled in the art that the MCU is a technically complex and expensive piece of equipment/system, and that use of the MCU is carefully controlled and billed to the user. In addition, it will be appreciated that because of its expense and limited availability, access to the MCU is treated as a rare resource. Thus, in order to guarantee to a given user the necessary resources for a desired conference at a given time, the user must reserve access to the MCU in advance of use. Reservations are made by a "reservation request" which typically involves a telephone call to an operator at the company with the MCU. In response to a reservation request which will often include parameters such as a starting time, a duration, and resources necessary (e.g., bandwidth, mixing and switching, etc.), the operator will typically access a "reservation controller", which is typically a programmed computer, in order to determine whether the required resources of the MCU will be available at the desired time. If the resources are available, the operator will enter information into the reservation controller program related to the incoming request for desired connections and services for the given time, accept the reservation, and inform the applicant/user of codes (e.g., a reservation number) required for the conference. When the time is reached for the conference, the reservation controller will inform the MCU of the beginning of a new conference and the precise resources reserved for that conference. When the users wish to join the conference and access the MCU, the users call the operator, provide the reservation number, and are added to the conference, with the necessary resources having been already reserved and available.

To date, the use of MCU's has been very limited. There are several reasons for this limited use. First, all multimedia services are extremely new, and most telecommunications customers have not yet invested in multimedia service equipment. It is expected, however, that the next five years will see an explosion of growth in the area of multimedia telecommunications. Second, the companies which provides multimedia equipment often utilize proprietary or alternative standardized schemes (e.g., MPEG and JPEG) which are not necessary compatible. Thus, it is often impossible for owners of different types of multimedia equipment to communicate with each other. Again, solutions to this problem are being proposed, including transcoders which are intended to make MPEG and JPEG equipment compatible. Third, and with respect to multipoint multimedia services such as conferencing, each manufacturer of an MCU uses its own proprietary reservation controller mechanism for reserving access to the MCU. Thus, unless each user in the conference has access to the same MCU, or to MCUs which are under control of the same reservation controller, it may be impossible for users to conference as desired because reservations requiring access to different MCUs may be impossible because of their control by different controllers.

SUMMARY OF THE INVENTION

It is therefore an object of the invention to provide a reservation controller for multimedia multipoint servers.

It is another object of the invention to provide a standardized reservation system which will permit any multimedia user to reserve the resources of one or more MCUs for a multimedia multipoint conference.

It is a further object of the invention to provide a reservation system for multimedia multipoint servers which utilizes the environment of the T.120 protocol series in receiving a reservation request.

It is an additional object of the invention to provide a multimedia multipoint server reservation system which has an established reservation domain which includes one or more reservation controllers and to which a user can attach in order to place a reservation application.

Another object of the invention is to provide an automatic multimedia multipoint reservation system.

A further object of the invention is to provide a multimedia multipoint server reservation system with multiple reservation controllers arranged in a hierarchical multiple domain structure.

An additional object of the invention is to provide a reservation domain having a reservation request channel utilized by multiple reservation controllers of a multimedia multipoint server reservation system.

Yet another object of the invention is to provide a server reservation system for multimedia multipoint communications with multiple reservation domains having continuous and/or dynamic connections.

In accord with the objects of the invention, and according to a first primary aspect of the invention, a reservation controller for use with one or more multimedia multipoint servers (MCUs) is provided where the reservation controller establishes a reservation domain with a reservation request channel on which reservation applications may be taken in the preferred embodiment, the reservation domain is established within the T.120 standard series requirements (with the term "domain" being defined in ITU-T T.122, and loosely defined as including all members who are connected to a conference), with multipoint connection under T.122/T.125 (Multipoint Communications Services), and interface to profiles such as ISDN, TCP/IP, PSDN (X.25), ATM, IEEE 802.3 (Ethernet) etc., under T.123 (Transport Protocol Stack Profiles). If desired, conference control under T.124 (Generic Conference Control) may also be provided, although other conference control mechanisms can be utilized. In accord with the invention, and based on the T.120 series of standards, a reservation "domain" with a reservation request channel is established within T.122/T.125 by the reservation controller in order to collect point-to-point transport connections and combine them to form a multipoint connection. An ongoing reservation conference is associated with the reservation domain. If the reservation controller establishes a reservation conference under T.124, the reservation domain is set up as part of the reservation conference.

When users wish to make reservations for resources of the multimedia multipoint server, they must know the address of the reservation domain, and must attach themselves to the reservation domain (the term "attach" also being defined in T.122) and join the reservation conference. Typically, this will be accomplished by establishing one or more transport connections (as defined by ITU-T standards X.214 and X.224 which are hereby incorporated by reference in their entirety herein) between the user and the reservation controller. The transport connection could be established either utilizing X.214 and X.224, or via the use of other protocols such as X.25, TCP/IP, ATM, etc., many of which are defined in ITU-T T.123. At the lower lasers, any type of protocol can be used such as Ethernet, ISDN, PPP, etc.) Once attached to the reservation domain, the user can make a reservation request by sending the reservation request onto the reservation request channel. All reservation requests forwarded onto the reservation request channel are received and acted upon by the reservation controller. The reservation controller is coupled to one or more MCUs and preferably stores the schedules of the MCUs to which it is coupled so that it can properly act on the reservation request.

In the situation where multiple reservation controllers are provided, as discussed below, the user calls the address domain of the "local" reservation controller in order to attach to the reservation domain and join the reservation conference. Once joined to the reservation conference, the user can then send the reservation request onto the reservation request channel of the reservation domain. By utilizing the reservation request channel, when a reservation request which affects MCUs of different reservation controllers is placed on the channel, each affected reservation controller can determine whether the MCU or MCUs for which it is responsible is/are available as requested. Preferably, the resulting determination of each controller is provided to the reservation controller of the MCU most local to the user for processing and forwarding to the user. Alternatively, each reservation controller can send information regarding the availability of its MCUs to the user.

In accord with a second primary aspect of the invention, a reservation system is provided and includes a first plurality of reservation controllers which are parties to a first reservation domain; i.e., the reservation controllers are all coupled to a first reservation request channel. The reservation system may be further expanded by including a second plurality of reservation controllers which are parties to a second reservation domain, where one or more reservation controllers can act as a bridge between the different domains. The bridge or connection between the domains can be static (continuous), or dynamic (connected intermittently on an as-needed basis). If desired, the reservation domains may be hierarchical; i.e., providing different levels. Thus, the reservation domains may parallel the local/regional/national/international telephone system, with first level domains relating to local MCUs, second level domains relating to regions (e.g., within a single area code); third level domains relating to countries; and fourth level domains relating to international conferences. The connections between the hierarchical domains can likewise be static or dynamic. It should also be appreciated that regardless of how the reservation domains of the reservation system are connected, and whether or not they are hierarchical, the reservation domains which are established are preferably established under the T.120 standard series requirements.

According to additional preferred aspects of the invention, each user receives reservation information (e.g., answers to reservation requests) on the user's private channel. Also, besides utilizing a reservation requests channel for transmission of reservation applications in a multi-reservation controller system, additional channels can be provided. For example, one or more channels dedicated for the transmission of management information between one or multiple reservation controllers and their associated MCUs may be provided. Likewise, one or more channels used solely for the transmission of reservation data amongst the different controllers may be provided.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
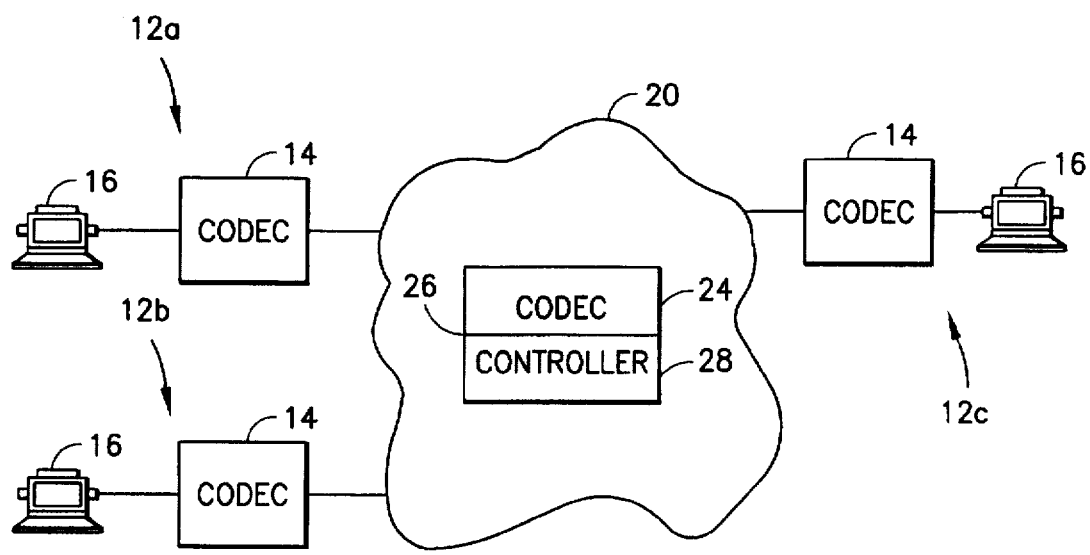
FIG. 1 is a representation of a multimedia conferencing system of the prior art, including a telecommunications network and an MCU.
Figure 2:
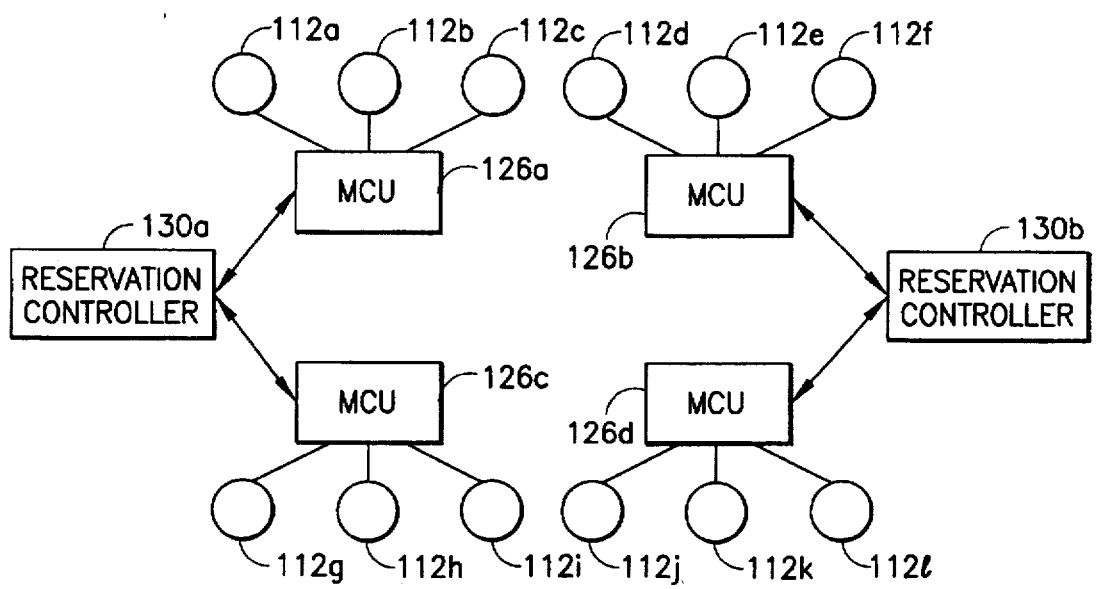
FIG. 2 is a high level diagram showing a system with a plurality of users, a plurality of MCUs, and a plurality of reservation controllers.

Turning to FIG. 2, a hypothetical telecommunications system is shown and includes a plurality of users 112a–112l (typically coupled to the network 20—see FIG. 1), a plurality of MCUs 126a–126d (typically located in the network), and a plurality of reservation controllers 130a, 130b (typically coupled to and/or located at the MCUs). Each reservation controller 130a, 130b, is shown coupled to two MCUs, while each MCU is shown servicing three users. It will be appreciated by those skilled in the art that depending upon its configuration and the needs of the users, each MCU can service many more than three users; and depending upon similar parameters, each reservation controller can service more than two MCUs. However, for purposes of simplicity of understanding, two reservation controllers, four MCUs, and twelve users are shown. With the provided arrangement, it will be appreciated that if users 112c, 112e, 112f, 112g, 112h, and 112j should wish to participate in a multimedia conference, the services of the four different MCUs 126a–126d will be required. Thus, the two reservation controllers 130a, 130b must be contacted to reserve appropriate access and processing of the MCUs.

However, with the systems that presently exist in the art, if the MCUs and reservation controllers are owned and operated by different companies, it may be impossible to arrange such a multimedia conference. In addition, with the provided arrangement it is not evident to which reservation controller the user should forward a reservation request, and how the reservation controllers will share the information contained in the request among themselves.

Figure 2A:
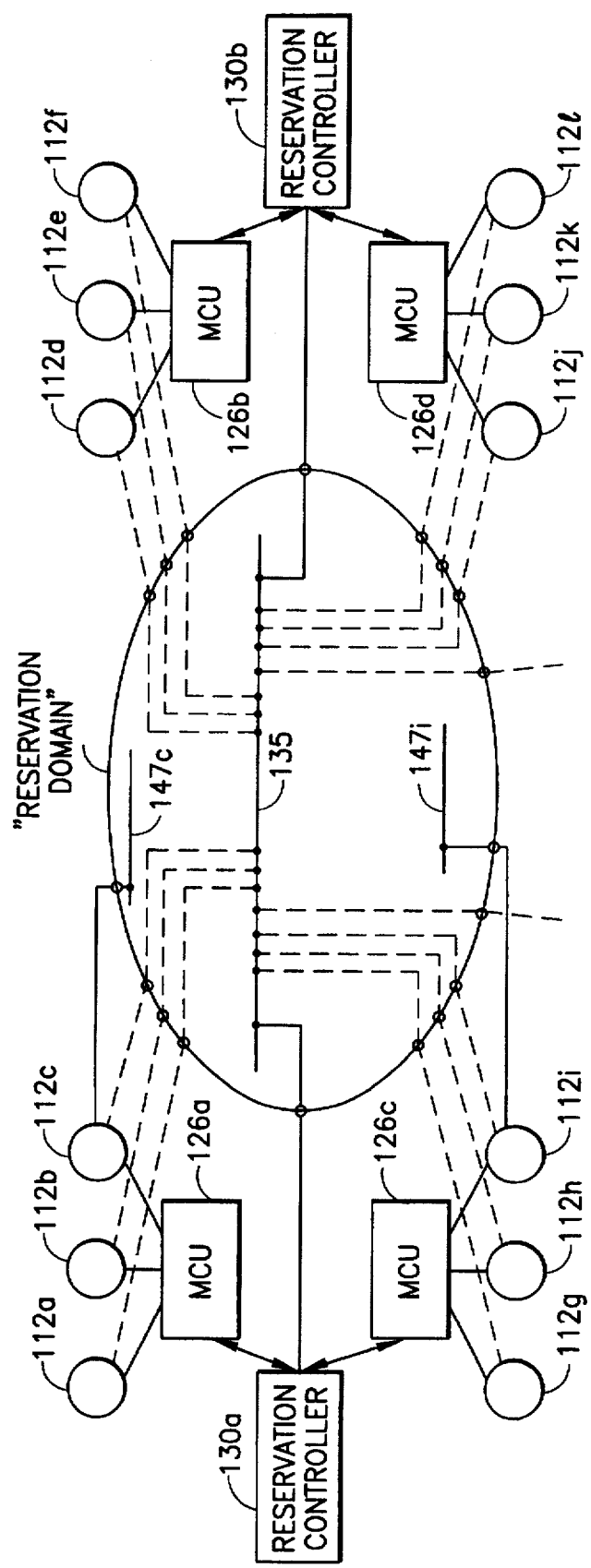
FIG. 2a is a high level diagram showing the system of FIG. 2 with the reservation domain and reservation request channel of the invention.

As seen in FIG. 2a, and in accord with the invention, one of the reservation controllers 130a, 130b of the hypothetical telecommunications system of FIG. 2 initiates and establishes a "reservation domain" which is provided with (typically upon request) a "reservation request channel" 135; and the other of reservation controllers attaches itself to the established reservation domain and joins the reservation request channel 135. The reservation domain is associated with a "reservation conference" (which if desired, may be pursuant to ITU-T T.124) and attachment to the reservation domain is accomplished by joining the conference. As is defined by ITU-T T.122 (MCS), any node (users, reservation controllers, MCUs, etc.) which attaches itself to a domain will be assigned a private channel (also called a "single member channel"). The private channel is normally used as a user identifier which provides a user identification and serves as an address for point-to-point communication within the multipoint domain. However, within T.122, another type of channel called a multicast channel can be defined to which any number of nodes can be joined. The reservation channel 135 is such a multicast channel.

It should be appreciated by those skilled in the art that any node which is attached to the domain can send data on any channel in the domain (the ability to send data being shown by dotted lines in FIG. 2a). However, only nodes which have joined a particular channel will receive the data sent on that particular channel (the ability to receive data being shown by solid lines in FIG. 2a). Thus, any node wishing to send private data to any other node will do so by sending this data on the private channel of the destination node, with representative private channels 147c and 147i being shown in FIG. 2a for users 112c and 112i.

A user who wishes to make a reservation will join the reservation conference and must attach himself to the reservation domain, but will not join the reservation request channel. Once attached to the reservation domain, the user can attempt to place a reservation by sending a reservation request onto the reservation request channel 135. The reservation request will typically include a plurality of multimedia conference parameters discussed in more detail below such as the starting time, the duration, the addresses of the users involved, and the resources necessary for the conference. In addition, the user will specify his own private channel address for reservation confirmation. Since the reservation controllers 130a, 130b are party to the reservation domain and have joined the reservation request channel, the parameters placed on the reservation request channel 135 are available to (i.e., are received by) the reservation controllers 130a and 130b.

Where the set of users who will be party to the multimedia conference all are serviceable by a single MCU (such as users 112d, 112e, and 112f), then the reservation controller (e.g., 130b) for that single MCU (e.g., MCU 126b) will make a determination as to whether the necessary MCU 126b resources will be available for the requested conference for the time requested. If so, the reservation controller 130b will confirm the reservation with the conference-initiating user via the private channel of the user. Where the set of users who will be party to the multimedia conference are not all serviceable by a single MCU (such as users 112a, 112b, and 112g), but a single reservation controller (e.g., controller 130a) is involved, again, the reservation controller can determine whether resources are available and can confirm the reservation with the conference-initiating user via the private channel of the user. However, where the set of users who will be party to the multimedia conference are serviced by multiple MCUs which are serviced by multiple reservation controllers, (such as users 112c, 112e, and 112f), then the reservation controller(s) (e.g., 130a, 130b) for the MCUs involved (e.g., MCUs 126a, 126b) will make determinations as to whether the necessary resources of the MCU 126a, 126b under their control will be available for the requested conference for the time requested.

Determination as to the availability of MCU resources which are governed by multiple reservation controllers can be accomplished in several ways. In one preferred embodiment where all of the reservation controllers are joined to the reservation request channel, and they all receive every reservation request which is sent to the channel, each controller is programmed to determine the part or parts of the resources requested by the user which are managed by itself. Thus, each reservation controller can proceed to process the part of the request for which it is responsible (i.e., a sub-request). After processing their sub-requests, those reservation controllers which are not the master reservation controller (i.e., the master being the most local reservation controller to the user) for the request send responses to the reservation controller which is the master for the request. After reviewing the responses, the master informs the user of the acceptance or refusal of the request on the private channel of the user, and informs the other reservation controllers of the result of the request. When a reservation is confirmed, the reservation controllers involved update their MCU resource files.

In a first alternative approach, rather than having each reservation controller respond to the master, each reservation controller can directly inform the user of its response.

The reservation process running at the user's terminal would then be used to gather all of the responses, so that the user could determine whether the reservation (or a portion thereof) could be accepted. If the resources proved to be suitable, the user would place a confirmation on the reservation request channel, and the reservation controllers would update their MCU resource files accordingly.

As a second alternative approach, the reservation controller responsible to answer the request (i.e., the master for the request), can communicate with the other reservation controller(s) and ask for the status of the MCU resources for which they are responsible. Upon gathering the information, the master can decide whether to accept the reservation or not, inform the user of the decision, and inform the other controllers so that they can update their MCU resource files if necessary.

It should be appreciated that besides requesting a new reservation, the user will typically have the capability of making other requests. For example, the user should be able to view, cancel, and modify a previously accepted reservation. Furthermore, the user preferably should be able to place queries regarding the availability of resources.

According to the preferred embodiment of the invention, the entire reservation system, including the reservation domain and the reservation request channel are generated in accordance with and comply with the ITU-T T.120 series of standards (the latest versions of which are all hereby incorporated by reference herein in their entirety). T.120 and T.121 define the relationship between a T.12x application and the remaining T.12x recommendations or standards, with T.120 defining the environment, and T.121 defining the Generic Application Model to be used with the applications which use T.122/T.125 (Multipoint Communications Service or MCS) and T.124 (Generic Conference Control or GCC). Therefore, to be compatible, a "reservation application" under T.120 must be built with respect to at least the T.120, T.121, and T.122/T.125 recommendations. Because audio and video control are not particularly pertinent to the reservation application, use of T.124 is optional, although minimal control is required for the multipoint application.

Figure 3:
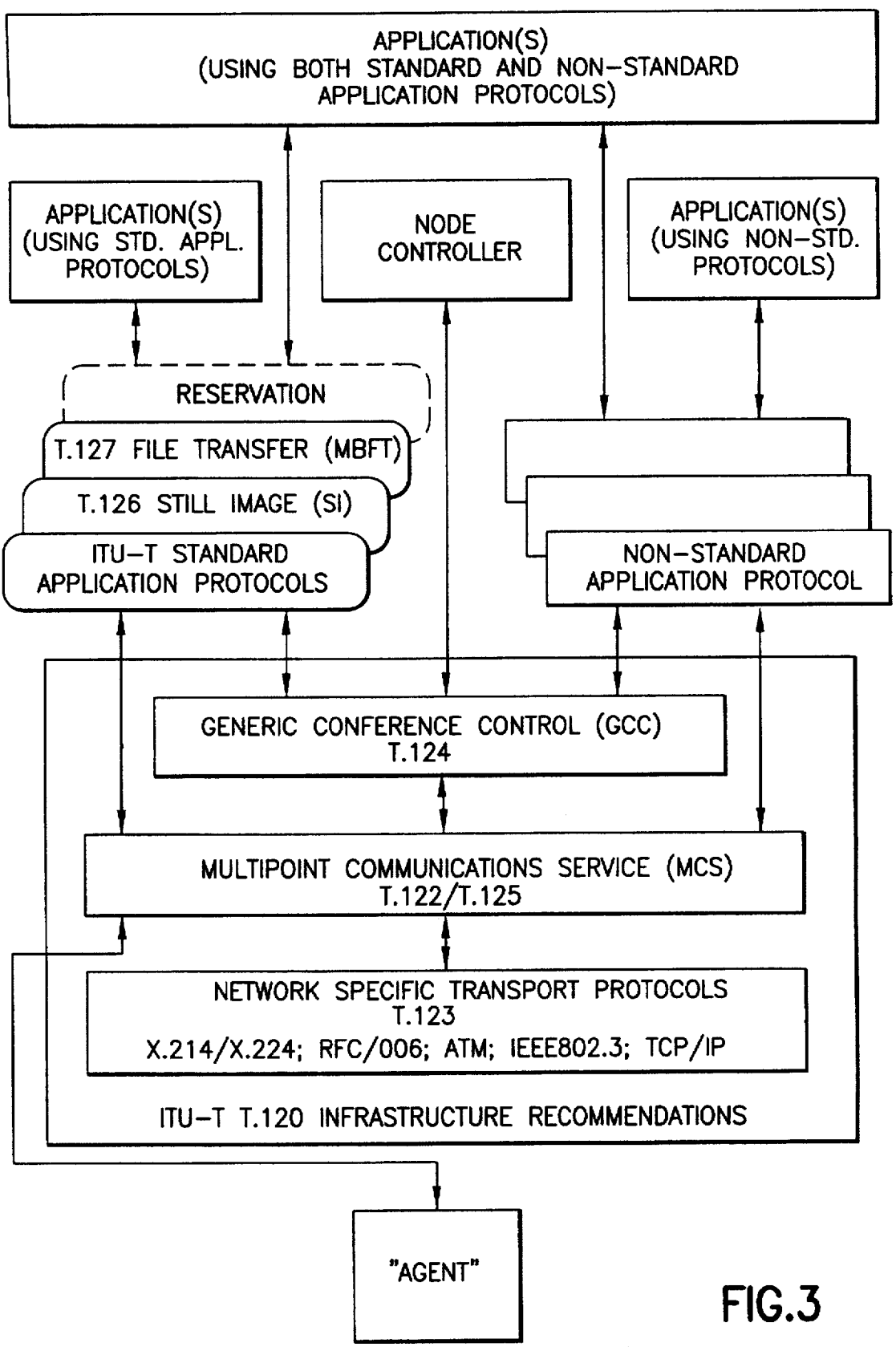
FIG. 3 is a diagram of the ITU-T T.120 series Infrastructure Recommendation modified in accord with the invention to show a reservation application.

As will be appreciated from FIG. 3, and in accord with the T.120 infrastructure recommendations, network specific transport protocols are set forth in T.123 which permit interface with profiles such as Ethernet (IEEE 802.3), TCP/IP (the Internet), X.214/X.224, ATM, etc. In addition, it should be appreciated that "agents" can be provided which will translate or otherwise transform commands and data of other profiles which are not part of T.123 so that interface with T.122/T.125 is possible.

Sitting atop the T.123 interface is the MCS T.122/T.125 standard which governs multipoint communications. Various multipoint applications can be implemented utilizing T.122/T.125. It should be appreciated that T.122/T.125 is particularly desirable and suitable for the reservation application of the invention (shown in dotted lines in the applications section of FIG. 3 to indicate that the reservation application is not yet a standard application of the ITU-T), as the reservation application of the invention utilizes multipoint communications. In addition, as shown in FIG. 3, the GCC T.124 standard can be provided for conference control, although the use of conference control under T.124 is not necessary for practicing the invention. If GCC is provided, however, a node controller is required for gathering requests from the applications and sending them to the GCC. It is noted that FIG. 3 shows that MCS and GCC can support applications using standard application protocols T.12x (such as T.126 Still Image and T.127 File Transfer), as well as applications using non-standard protocols and applications using standard and non-standard protocols.

Figure 4:
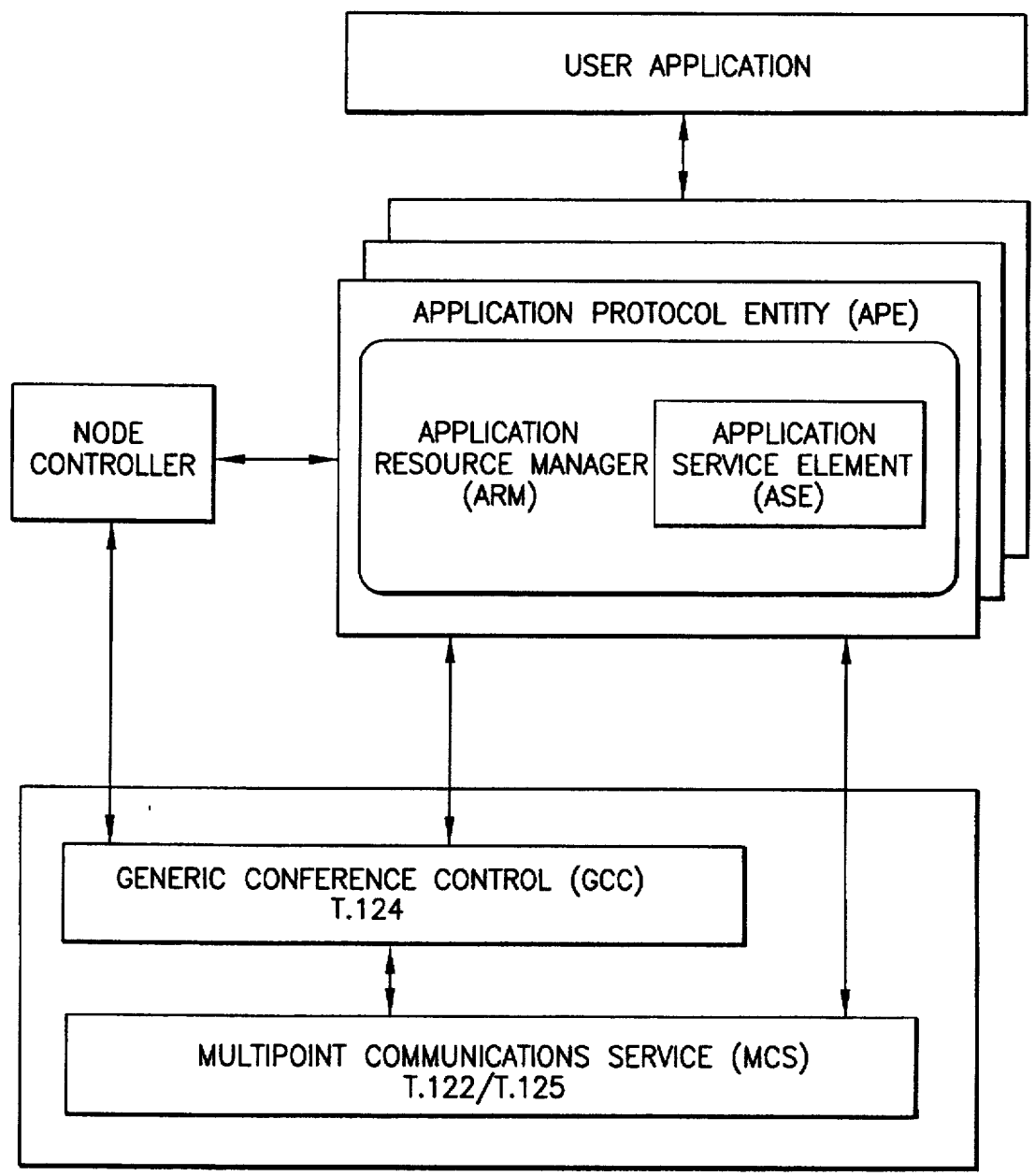
FIG. 4 is a diagram of a ITU-T T.120 generic application model on which the reservation application of the invention is based.

As will be appreciated by those skilled in the art, and as suggested by FIG. 4, the T.121 standard requires that applications include two parts: a User Application (UA), and one or more Application Protocol Entities (APEs). An APE is further divided into two elements: an Application Resource Manager (ARM), and an Application Service Element (ASE).

The User Application has no direct affect on interworking and thus may be product and platform specific. The User Application relies on the services of one or more APEs to communicate with peer applications at other nodes, and does not directly communicate with the MCS (T.122/T.125) and the GCC (T.124) shown in FIG. 4. According to a preferred embodiment of the invention the reservation UA is programmed to include the following functionalities which are described in more detail in Appendix A hereto: reservation type, address list, repeating and periodic conferences, help menu, and input validity checking. The reservation type functionality is a program which permits the user to indicate whether a new reservation is being requested, or whether a review, change or cancellation of a prior reservation is being requested. The address list functionality is a program which permits and/or requires the user to enter a list of addresses, write cascaded lists, edit address lists on-line, name a list, edit a previously made list, label each address in the list, and specify which entry in the list will have chairperson/broadcaster control.

The UA can also specify parameters which are to be provided by the customer. Among the preferred customer-provided parameters which are described in more detail in Appendix A are: account billing, number of conferees, conference timing, conference setup mode, conference mode, conference quality, physical channel selection, and video receiving mode. The account billing permits the user to enter the calling number or card number which is to be the billed account. The number of conferees who will participate in the conference should be fixed at reservation time due to resource allocation management, although the user should be able to modify this number before or during the conference, provided resources are free at the MCUs involved. The date, time, and duration of the conference should also be fixed at reservation time due to resource management, with the duration also being alterable before or during the conference subject to resource availability. In conjunction with duration parameter, the user may be able to specify a conference termination mode.

The conference setup mode is the mode used by the conferees to join a conference and may specify a parameter (whether the conference is listed or not) and three lists. When the parameter indicates that the conference is not listed, only the conferees specified in the three lists can joint the conference. Otherwise, any conferee with the proper password can join the conference. The three lists preferably include a list of users that will be automatically called when the conference is created, a list of customers who have permission to joint the conference after it is created provided that they have the proper password, and a list of customers who have permission once they are conferees to invite other customers to joint the conference. Each list can contain data or be empty.

The conference mode should include the four known basic modes of voice-activated switching, chairperson control, broadcast monologue, and broadcast dialogue. In addition, if desired, other modes such as conferee's choice, automatic control, and subconferencing can be supported. In conferee's choice, each conferee can decide whom (s)he wants to see and whom s(he) wants to hear. In automatic control, the MCU will decide what must be seen by whom as well as what must be heard. If subconferencing is enabled, two or more participants to a conference will be able to initiate a "private" conference while they are still members of the initial conference.

The conference quality parameter provided by the user specifies the video and audio qualities (bandwidths) desired, as well as the bandwidth desired for other data. Video quality may be constrained by the standard (e.g., JPEG or MPEG) being used, as well as local resources of the conferees, network capacity, etc. Likewise, audio quality may be constrained by the standard being used, and the application (audio vs. voice). The physical channel selection parameter provided by the user allows the user to specify and identify which video terminals will use circuit switching to connect to the MCU and which video terminals will use private lines to connect the MCU. Finally, the video receiving mode permits the user to select whether conferees will receive a single video feed (e.g., of the current speaker) from another conferee, a merged video feed (e.g., a quad split or "continuous presence"), or multiple video feeds which permits the conferee to individually configure and position the incoming images.

Turning now to the Application Protocol Entities (APE) side of the T.121 standard requirement, the Application Resource Manager (ARM) of the APE provides generic functionality common to all standardized application protocols, while the Application Service Elements (ASEs) provide functionality specific to their respective application protocols. As set forth by T.121, an APE is characterized by the following attributes: a single MCS service access point (SAP); a single GCC SAP, a single application user ID, a single ARM, a single ASE, and a node controller SAP.

The ARM is responsible for managing GCC and MCS resources on behalf of the ASEs within the APE. The ARM should provide the following services: responding to indications from the GCC (e.g., permission to enroll, invoke); enrolling ASEs with the GCC; obtaining handles from the GCC; attaching to an MCS domain to obtain a single Application User ID for all ASEs within the APE; joining static channels; identifying and joining multicast channels using the GCC Registry and MCS; convening private channels and admitting peer ASEs to such channels; joining any private channels to which an ASE has been admitted; identifying and obtaining tokens from the GCC Registry; deleting entries from the registry associated with any multicast channel it may have convened; invoking peer APEs at other nodes; and processing Application Roster reports to determine the negotiated Application Capability list and identity of peer nodes.

The ASE provides application protocol specific functionality to the user application with resources obtained by the ARM. Its operation is independent of the type and identity of tokens and channels passed to it. The User Application should specify the type of resources to use, but not the identity of those resources. The ASE obtains the identity of resources to use from its ARM.

The ASE provides the following services: sending and receiving application protocol-specific protocol data units (PDUs); grabbing and releasing tokens and determining token status using MCS; responding to GCC Conductor Assign and Release indications; issuing GCC-Conductor-Permission-Ask requests through the Node Controller; and responding to GCC-Conductor-Permission-Grant indications.

According to the preferred embodiment of the invention, the reservation application has a protocol which is divided into three parts: the user (conferee) part which is the part which runs on the user's terminal and allows the user to make a reservation; the MCU part which runs at the MCU; and the server part which runs at the reservation controller and processes all the reservation requests. These three separate parts represent a logical division of the protocol and not necessarily a physical one, as the physical MCU can have both the MCU and the server part of the protocol. In other words, the MCU and the reservation controller may be integrated physically.

The user part of the reservation application is the part that runs on the user's terminal. It allows the user to exchange data with the reservation server in order to make reservations. The tasks of this part are: to establish and maintain a MCS (T.122/T.125) connection via T.123 with a reservation controller; to accept, code, and send reservation requests and parameters of the user to the reservation controller via the reservation request channel; and to receive results from the reservation controller via the user's private channel and display them to the user.

The MCU part of the reservation application runs on the MCU and allows the MCU to communicate with the reservation controller to inform it of the status of its resources. The tasks of this part are to establish and maintain a connection with the reservation controller, and to receive and answer requests from the reservation controller regarding the status of the resources of the MCU and the starting of conferences.

Figure 4A:
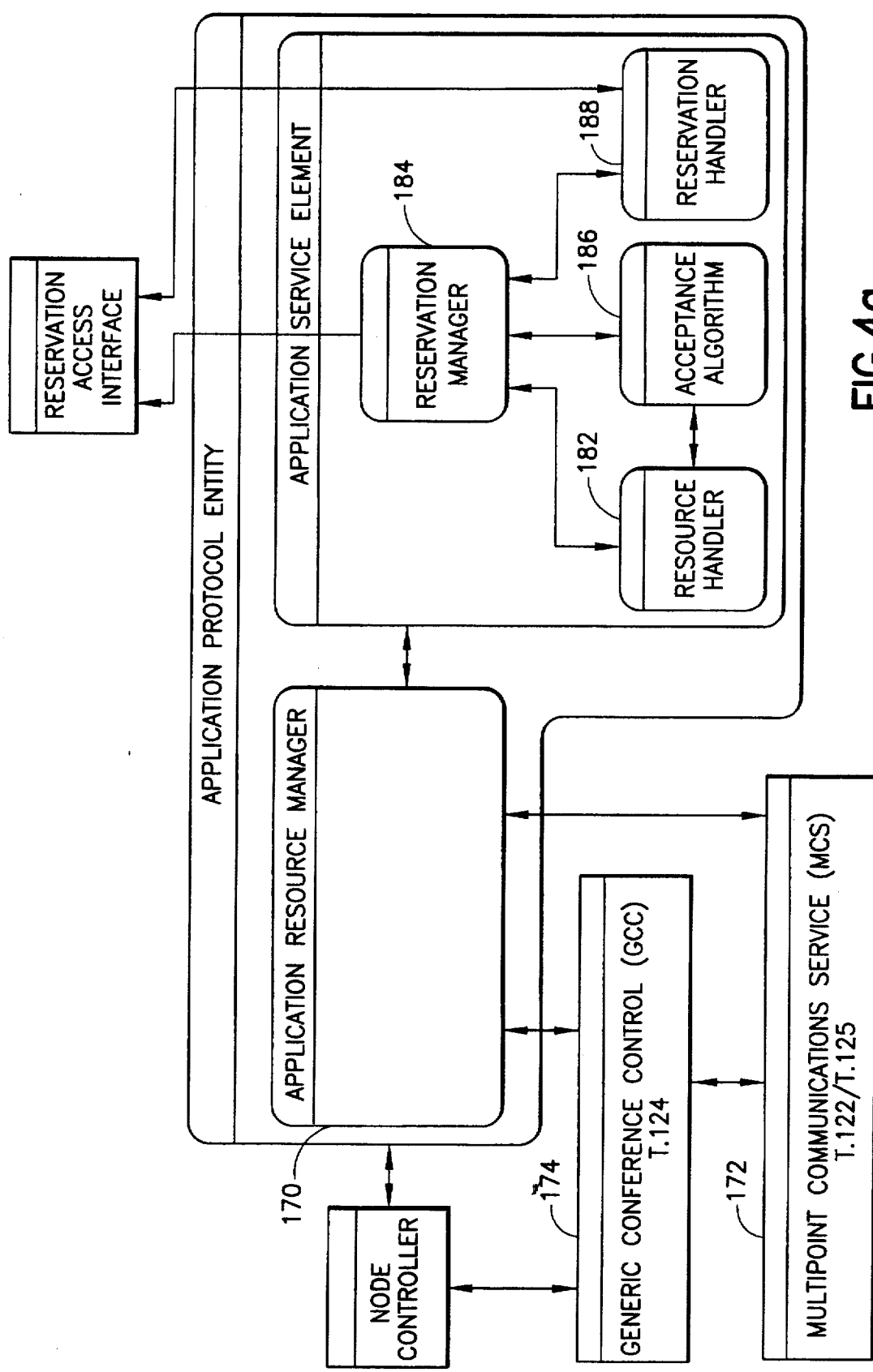
FIG. 4a is a diagram of the server part of the reservation application of the invention.

The server part of the reservation application is the part that runs on the reservation controller which is preferably embodied as a suitably programmed SUN SPARC STATION 5 having suitable memory (although other processors, computers, or work stations could be utilized). The server part of the reservation application which is shown schematically in FIG. 4a allows the controller to exchange data with the users and the MCUs in order to process the different requests of the users/conferees. The tasks of this server part are to: establish and maintain multiple simultaneous MCS connections with users, MCUs, and other reservation controllers (via use of the application resource manager 170, the MCS 172, and if desired, the GCC 174), thereby establishing a reservation domain and conference; monitor the status of all MCUs connected to the reservation controller, including notifying the MCUs of the start and the resources required for a conference (using the resource handler 182); receive, process, and accept or refuse the requests of the users such as new reservations, modifications of reservations, etc. based on any desired acceptance algorithm (using the reservation manager 184 and the acceptance algorithm 186); maintain a list of the reservations for which it is responsible (at the reservation handler 188 of FIG. 4a); and exchange data with other reservation controllers when a reservation request necessitates the use of more than one reservation controller. It will be appreciated by those skilled in the art, that the algorithm for accepting or rejecting new reservations, or modifications of the reservations can be proprietary to the supplier of the reservation controller.

Figure 5:
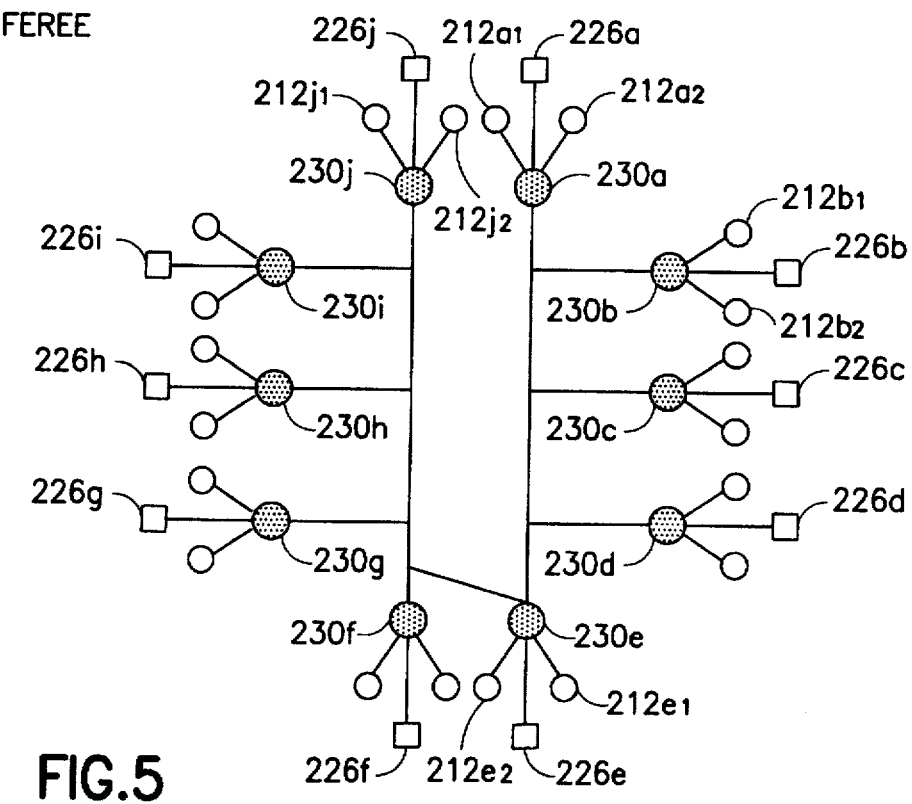
FIG. 5 is a high level diagram of a single level reservation system according to the invention.

Turning now to FIG. 5, a hypothetical system with ten reservation controllers 230a–230j, each of which is respectively coupled to an MCU 226a–226j and two users 212a1–212j2 is seen. The reservation controllers of the reservation system of FIG. 5 are structured on a single level, in that any reservation controller can connect itself to any other reservation controller and exchange data with it. It should be appreciated, that in accordance with the invention, the single level structure of the system of FIG. 5 can utilize a single reservation domain, or multiple reservation domains. In particular, if all of the reservation controllers 230a–230j are attached to the same reservation domain, then they will all be joined to the same reservation request channel. Thus, any reservation request which is placed on the reservation request channel will be reviewed by each reservation controller of the system for purposes of determining whether its resources will be required. On the other hand, where numerous reservation controllers are being utilized, it might be advantageous to break the reservation controllers into more than one domain. In this situation, at least one of the reservation controllers should act as bridge by being part of two or more reservation domains. Thus, if a user should wish to establish a conference with conferees who would be handled by the reservation controller of another domain, the bridge controller would pass the reservation request information onto the reservation request channel of the other reservation domain so that the appropriate reservation controller in the other domain could address the request. In FIG. 5, a single level, two domain system is seen, where reservation controllers 230a–230e are part of a first domain, and reservation controllers 230e–230j are part of the second domain. Since reservation controller 230e is part of both domains, it acts as the bridge controller.

Figure 6:
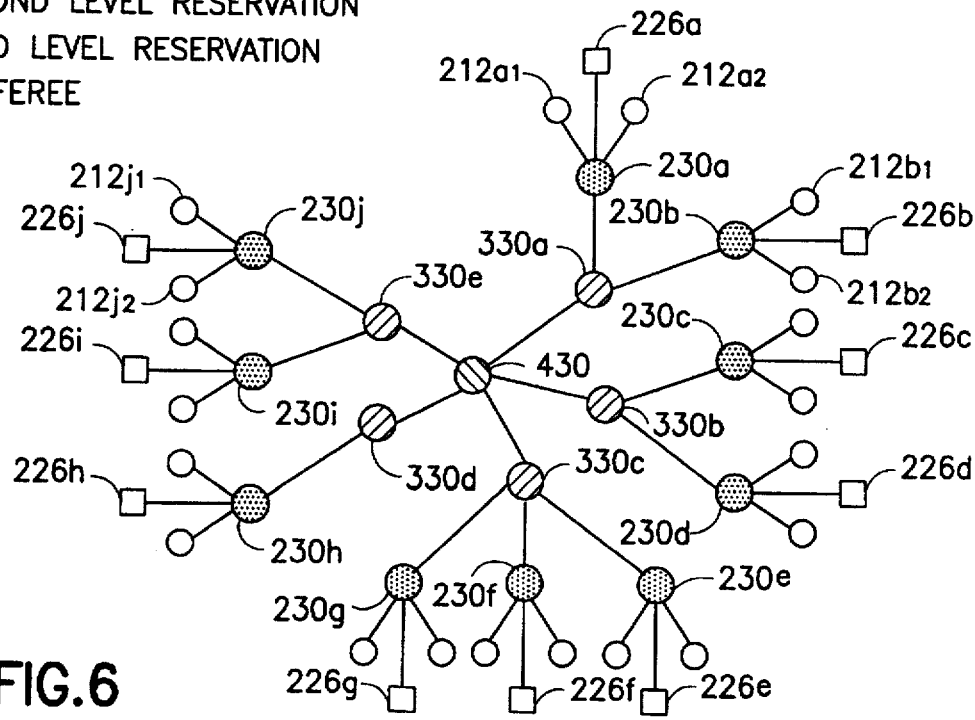
FIG. 6 is a high level diagram of a hierarchical reservation system with multiple levels according to the invention.

Turning to FIG. 6, the same ten reservation controllers 230a–230j, MCUs 226a–226j, and users 212a1–212j2 discussed above with reference to FIG. 5 are seen, but they are arranged in a multiple level or hierarchical architecture. In a hierarchical system, multiple domains are established. While many different hierarchical systems can be provided, the system of FIG. 6 suggests a preferred approach where each reservation controller (with each controller possibly corresponding to a plurality of local exchanges) establishes its own reservation domain with one or more local MCUs and the local users. A plurality of second level reservation domains (each corresponding, if desired, to an area code) are established by providing second level reservation controllers 330a–330e which share a reservation request channel with one or more of the first level reservation controllers. Thus, as seen in FIG. 6, reservation controllers 230a and 230b are conferenced with second level controller 330a in a first second level reservation domain; reservation controllers 230c and 230d are conferenced with second level controller 330b in a second second level reservation domain; reservation controllers 230e, 230f, and 230g are conferenced with second level controller 330c in a third second level reservation domain; reservation controller 230h is conferenced with second level controller 330d in a fourth second level reservation domain; and reservation controllers 230i and 230j are conferenced with second level controller 330e in a fifth second level reservation domain.

A third level reservation domain is shown in FIG. 6 by the provision of a third level controller 430 which conferences with all of the second level reservation controllers 330a–330e. The third level domain can correspond, if desired, to a country code. It should be appreciated that a fourth level (e.g., international) domain may also be established. In fact, by hierarchically dividing the domains in different manners, it will be appreciated that many more than four levels can be provided.

The advantage of the hierarchical architecture of FIG. 6 over the single level architecture of FIG. 5 is that there is no need for a bridging reservation controller to keep large amounts of information regarding the different systems which it is bridging. Rather, if a reservation controller notes a request on the reservation request channel of its domain which it cannot handle, it immediately passes that information to the reservation controller of the higher domain to which it is also party. Depending upon whether or not the information can be handled at that level, the reservation controller of the higher domain may then either pass the information to yet a higher domain, or back down to the appropriate lower domain. Thus, in the hierarchical architecture, the reservation controllers bridge different levels of domain, but need not keep detailed information regarding the higher domains.

It should be appreciated by those skilled in the art that the architectures of FIGS. 5 and 6 are not necessarily exclusive of each other. In other words, it is possible to use single level bridging reservation controllers as part of one or more levels of a hierarchical arrangement. It will also be appreciated that the architecture of the reservation application can be based on either a "continuous connection" or a "dynamic connection" type arrangement. In the continuous connection arrangement, all nodes that are concerned by reservations, as well as the nodes that might need one time to make a reservation must be connected continuously to the reservation domain. The advantage of the continuous connection arrangement is that MCS connection time is minimized. With the dynamic connection arrangement, the nodes establish different connections based on their instant needs, with connections being made each time a conferee has a reservation request, and connection being released once the processing of the request is terminated. With the dynamic connection arrangement, a connection is created (i.e., the domain is modified) for each request, and the connection is deleted (i.e., the domain is modified again) when the result of the request is known. The advantage of the dynamic connection arrangement is that the cost of connection is limited only to the time of actual usage. Again, it should be recognized that the continuous connection and dynamic connection arrangements may be co-utilized. For example, the domains which include the users may be set up as dynamic connection reservation domains, as most users will not need continuous type connections and will find it expensive to keep a connection active when nobody is transmitting data. On the other hand, the domains which include only reservation controllers (and MCUs) may be set up as continuous connection reservation domains, as large amounts of data may be regularly sent, and connection may be required almost continuously. If desired, statistical measurements may be made of the use of each connection and therefrom a decision can be made as to whether the dynamic or the continuous connection is most desirable for that connection. In fact, if desired, some connections may be continuous during periods of peak usage, and dynamic at other times.

There have been described and illustrated herein multimedia multipoint telecommunications reservation systems. While particular embodiments of the invention have been described, it is not intended that the invention be limited thereto, as it is intended that the invention be as broad in scope as the art will allow and that the specification be read likewise. Thus, while the invention has been described with reference to the ITU-T T.120 family of standards, it will be appreciated that other platforms could be utilized provided that a reservation domain is established with a reservation request channel to which users can connect to make a reservation request. Likewise, while the invention was described with reference to particular arrangements with only one or two MCUs coupled to each reservation controller, and only two or three users coupled to an MCU, it will be appreciated that different numbers of MCUs could be used in conjunction with a reservation controller, and different numbers of users could be coupled to an MCU. In fact, pursuant to T.122/T.125, up to 65,535 connections can be made in a single domain, although it would not be deemed advisable to have so many users connected to a single MCU. Also, while the conference control was described with reference to T.124, it will be appreciated that since only minimal control is necessary for the reservation application (i.e., data only as opposed to audio/video/data), other control mechanisms which do not meet T.124 requirements could be utilized. It will therefore be appreciated by those skilled in the art that yet other modifications could be made to the provided invention without deviating from its spirit and scope as so claimed.

What is claimed is:

1. A reservation controller for controlling access to at least one telecommunications multimedia multipoint control unit (MCU), comprising:
  a) means complying substantially with ITU-T T.122 multipoint communications service (MCS) protocol for establishing with multipoint connection a reservation domain with a reservation request channel;
  b) conference control means associated with said reservation domain and establishing an ongoing reservation conference;
  c) first interface means complying substantially with at least a portion of ITU-T T.123 network specific transport protocol for interfacing with a data transport profile of a user who wishes to make a reservation;
  d) second interface means for coupling said reservation controller to the at least one MCU;
  e) reservation application protocol entity means including means for receiving a reservation request placed on said reservation request channel, and means for determining whether the at least one MCU coupled to said reservation controller has sufficient resources to meet said reservation request, wherein
    the user makes said reservation request by attaching to said reservation domain, joining said ongoing reservation conference, and placing said reservation request on said reservation request channel.

2. A reservation controller according to claim 1, wherein:
  said first interface means complies substantially with all of said ITU-T T.123 network specific transport protocol and provide an X.214/X.224 protocol interface, an IEEE 802.3 protocol interface, an ATM protocol interface, and a TCP/IP protocol interface.

3. A reservation controller according to claim 1, wherein:
  said conference control means complies substantially with at least a portion of ITU-T T.124 generic conference control (GCC) protocol, and controls said ongoing reservation conference.

4. A reservation controller according to claim 1, wherein:
  said reservation controller is coupled to a plurality of MCUs, and said reservation application protocol entity means includes means for storing resource schedules of said plurality of MCUs.

5. A reservation controller according to claim 1, further comprising:
  means for sending a response regarding said reservation request to the user via a private channel of the user.

6. A reservation controller according to claim 1, further comprising:
  means for collecting information from another reservation controller.

7. A reservation controller according to claim 6, wherein:
  said information is a response by said the other reservation controller to a reservation request regarding an MCU coupled to the other reservation controller.

8. A reservation controller according to claim 6, wherein:
  said information relates to a resource schedule of an MCU coupled to the other reservation controller.

9. A reservation system which controls access to a plurality of telecommunications multimedia multipoint control units (MCUs), comprising:
  a) a first reservation controller having
    means for establishing with multipoint connection a first reservation domain with a first reservation request channel,
    conference control means associated with said first reservation domain and establishing a first ongoing reservation conference,
    first interface means for interfacing with a data transport profile of a user wishing to make a reservation,
    second interface means for coupling said first reservation controller to a first MCU of the plurality of MCUs the resources of which is controlled by said first reservation controller, and
    first reservation application protocol entity means including first means for receiving a reservation request placed on said first reservation request channel, and means for determining whether the first MCU coupled to said first reservation controller has sufficient resources to meet its portion of said reservation request;
  b) a second reservation controller having
    means for joining said first ongoing reservation conference and for coupling to said first reservation request channel, wherein reservation requests of a user placed on said first reservation request channel are available to said second reservation controller when said second reservation controller is joined to said first ongoing reservation conference,
    third interface means for coupling said second reservation controller to a second MCU of the plurality of MCUs the resources of which is controlled by said second reservation controller, and
    second reservation application protocol entity means including second means for receiving a reservation request placed on said reservation request channel.

10. A reservation system according to claim 9, wherein:
  said second reservation controller has means for determining whether the second MCU coupled to said second reservation controller has sufficient resources to meet its portion of said reservation request, and means for forwarding a resource determination to said first reservation controller.

11. A reservation system according to claim 9, wherein:
  said second reservation controller includes means for sending information regarding resources of said second MCU to said first reservation controller.

12. A reservation system according to claim 10, wherein:
  said second reservation controller has fourth interface means for interfacing with a data transport profile of another user wishing to make a reservation.

13. A reservation system according to claim 12, wherein:
  said second reservation controller further includes means for establishing with multipoint connection a second reservation domain with a second reservation request channel, and second conference control means associated with said second reservation domain and establishing a second ongoing reservation conference.

14. A reservation system according to claim 9, wherein:

said second reservation controller further includes means for establishing with multipoint connection a second reservation domain with a second reservation request channel, and second conference control means associated with said second reservation domain and establishing a second ongoing reservation conference.

15. A reservation system according to claim 14, further comprising:

a third reservation controller coupled to at least one of said first and second reservation domains and having, second means for joining at least one of said first and second ongoing reservation conferences and for coupling to at least one of said first and second reservation request channels, interface means for coupling said third reservation controller to a third MCU of the plurality of MCUs the resources of which is controlled by said third reservation controller, and third reservation application protocol entity means including third means for receiving a reservation request placed on one of said first and second reservation request channels.

16. A reservation system according to claim 15, wherein:

said first reservation domain is at a first hierarchical level, and said second reservation domain is at a second hierarchical level.

17. A reservation system according to claim 16, wherein:

said third reservation controller is at one of said first and second hierarchical levels.

18. A reservation system according to claim 16, wherein:

said third reservation controller is at a third hierarchical level, and further includes means for establishing with multipoint connection a third reservation domain with a third reservation request channel, and third conference control means associated with said third reservation domain and establishing a third ongoing reservation conference.

19. A reservation system according to claim 16, wherein:

said means for joining said first ongoing reservation conference joins said second reservation controller to said first ongoing conference on an as-needed basis.

20. A reservation system according to claim 16, wherein:

said means for joining said first ongoing reservation conference joins said second reservation controller to said first ongoing conference on an ongoing static basis.

21. A reservation system according to claim 9, wherein:

said means for establishing with multipoint connection a first reservation domain, and said means for joining said ongoing first reservation conference and for coupling to said first reservation request channel both comply substantially with ITU-T T.122 multipoint communications service (MCS) protocol.

22. A reservation system according to claim 21, wherein:

said first interface means complies substantially with at least a portion of ITU-T T.123 network specific transport protocol for interfacing with a data transport profile of a user who wishes to make a reservation.

* * * * *